(12) United States Patent
Ito et al.

(10) Patent No.: US 8,212,157 B2
(45) Date of Patent: Jul. 3, 2012

(54) LOAD SENSOR FOR VEHICLE SEAT WITH AN ATTACHED AMPLIFIER SUBSTRATE SHIELDED BY AN ATTACHED METAL BRACKET AND THE SENSOR MOUNTING MECHANISM

(75) Inventors: Koji Ito, Yatomi (JP); Muneto Inayoshi, Nagoya (JP); Kan Ichihara, Kariya (JP); Hiroyuki Fujii, Kariya (JP); Yoshimasa Asano, Kariya (JP); Naoka Kawajiri, Kariya (JP); Takeshi Kuwabara, Gifu (JP); Hajime Shiohara, Obu (JP)

(73) Assignee: Aisin Seiki Kabushiki Kaisha, Kariva-Shi, Aichi-Ken (JP)

( * ) Notice: Subject to any disclaimer, the term of this patent is extended or adjusted under 35 U.S.C. 154(b) by 300 days.

(21) Appl. No.: 12/628,777

(22) Filed: Dec. 1, 2009

(65) Prior Publication Data
US 2010/0133017 A1 Jun. 3, 2010

(30) Foreign Application Priority Data
Dec. 2, 2008 (JP) .................................. 2008-307795

(51) Int. Cl.
G01G 19/52 (2006.01)
G01G 19/12 (2006.01)
G01G 23/00 (2006.01)
G01B 7/16 (2006.01)
G01L 1/00 (2006.01)
B60R 21/015 (2006.01)

(52) U.S. Cl. ... 177/136; 177/144; 177/211; 73/862.391; 180/273; 280/735

(58) Field of Classification Search ............. 73/862.391, 73/862.474, 781; 177/136, 144, 211, 229; 180/273; 280/735
See application file for complete search history.

(56) References Cited

U.S. PATENT DOCUMENTS
4,815,547 A * 3/1989 Dillon et al. ............... 177/25.14
(Continued)

FOREIGN PATENT DOCUMENTS
JP 2001-150997 A 6/2001
(Continued)

OTHER PUBLICATIONS
Rasul, Jad S. "Printed Wiring Board Technology." Wiley Encyclopedia of Electrical and Electronics Engineering. J. Webster ed. 1999.*

Primary Examiner — Randy W Gibson
(74) Attorney, Agent, or Firm — Buchanan Ingersoll & Rooney PC

(57) ABSTRACT

A load detection device for a vehicle seat mounted between a floor side mounting mechanism made of metal and a seat side mounting mechanism made of metal and measuring a load applied by an occupant seated on the vehicle seat includes a strain generating body adapted to be fixed via both end portions to a fitting surface formed at one of the floor side mounting mechanism and the seat side mounting mechanism while having a predetermined clearance from the fitting surface, a strain gauge attached to the strain generating body, a bracket made of metal and including an attachment portion that extends laterally relative to the strain generating body, and an amplifier substrate mounted on the attachment portion while being arranged in parallel to the strain generating body, both surfaces of the amplifier substrate being covered by one of or more of the bracket, the floor side mounting mechanism and the seat side mounting mechanism, the amplifier substrate amplifying a signal output from the strain gauge.

11 Claims, 8 Drawing Sheets

U.S. PATENT DOCUMENTS

| | | | |
|---|---|---|---|
| 5,623,128 A * | 4/1997 | Grimm et al. | 177/25.13 |
| 6,118,082 A * | 9/2000 | Bissette | 177/116 |
| 6,786,104 B1 | 9/2004 | Aoki | |
| 6,840,119 B2 | 1/2005 | Aoki | |
| 7,048,085 B2 * | 5/2006 | Lichtinger et al. | 180/273 |
| 7,155,981 B2 | 1/2007 | Matsuura et al. | |
| 7,487,687 B2 * | 2/2009 | Sumi et al. | 73/862.391 |
| 7,490,523 B2 * | 2/2009 | Sakamoto et al. | 73/862.391 |
| 7,503,417 B2 * | 3/2009 | Lichtinger et al. | 180/273 |
| 7,514,638 B2 * | 4/2009 | Inayoshi et al. | 177/136 |
| 7,555,960 B2 * | 7/2009 | Nakano et al. | 73/781 |
| 7,559,249 B2 * | 7/2009 | Nakano et al. | 73/781 |
| 7,712,374 B2 * | 5/2010 | Kawabata et al. | 73/781 |
| 7,823,459 B2 * | 11/2010 | Ito et al. | 73/781 |
| 2008/0098822 A1 * | 5/2008 | Sakamoto et al. | 73/781 |
| 2008/0098823 A1 * | 5/2008 | Sumi et al. | 73/781 |
| 2008/0134797 A1 * | 6/2008 | Nakano et al. | 73/781 |
| 2008/0156103 A1 * | 7/2008 | Nakano et al. | 73/781 |
| 2009/0064792 A1 | 3/2009 | Kawabata et al. | |
| 2009/0126500 A1 * | 5/2009 | Ito et al. | 73/781 |
| 2010/0122854 A1 * | 5/2010 | Ito et al. | 177/136 |

FOREIGN PATENT DOCUMENTS

| | | |
|---|---|---|
| JP | 2003-83707 A | 3/2003 |
| JP | 2008-132968 A | 6/2008 |
| JP | 2008-132969 A | 6/2008 |
| JP | 2008-134226 A | 6/2008 |
| JP | 2008-134232 A | 6/2008 |

* cited by examiner

LOAD SENSOR FOR VEHICLE SEAT WITH AN ATTACHED AMPLIFIER SUBSTRATE SHIELDED BY AN ATTACHED METAL BRACKET AND THE SENSOR MOUNTING MECHANISM

CROSS REFERENCE TO RELATED APPLICATIONS

This application is based on and claims priority under 35 U.S.C. §119 to Japanese Patent Application 2008-307795, filed on Dec. 2, 2008, the entire content of which is incorporated herein by reference.

TECHNICAL FIELD

This disclosure relates to a load detection device for a vehicle seat.

BACKGROUND DISCUSSION

In order to improve performance of various safety devices such as a seatbelt and an air bag, operations of such safety devices may be controlled depending on a weight of an occupant seated on a vehicle seat. As a means for measuring the weight of the occupant, i.e., a load thereof, it is known to use a sensor in which a strain gauge is utilized to detect a small deformation of a seat frame, and the like. The strain gauge detects a small change in the shape as a change in electrical resistance to thereby output a weak electrical signal. An amplifier substrate for amplifying the electrical signal is generally used in combination with the strain gauge. In a vehicle interior, however, various electromagnetic noises such as an ignition noise of an engine are emitted from a driving device, a lighting device, and the like. Accordingly, a shield structure for reducing an influence of the electromagnetic noise to the sensor is applied. The shield structure includes a metallic shield member having a thickness in response to a desired shielding performance so as to cover an electronic circuit such as the amplifier substrate to thereby block propagation of the electromagnetic noise.

A noise shield structure for a load detection sensor for a vehicle seat is disclosed in JP2008-134226A (which will be hereinafter referred to as Reference 1). The shield structure disclosed in Reference 1 includes a strain generating body of which both end portions are fixed to one of a floor side mounting member and a seat side mounting member and of which a center portion is fixed to the other one of the floor-side mounting member and the seat side mounting member. The noise shield structure further includes a strain gauge attached to the strain generating body, an amplifier substrate amplifying an output from the strain gauge, and a metallic bracket by means of which the amplifier substrate is arranged next to the strain generating body in parallel thereto. One surface of the amplifier substrate is covered by the bracket while the other surface is covered by a ground pattern made of metallic foil.

According to the shield structure disclosed in Reference 1, because both of the surfaces of the amplifier substrate are covered by the bracket and the ground pattern, the influence of the electromagnetic noise is reduced. In addition, a distance between the strain gauge and the amplifier substrate is extremely short, which leads to a space reduction. Further, because the bracket for attaching the amplifier substrate and the ground pattern of the electronic circuit within the amplifier substrate are used as the shield structure, an additional member for shielding is not required, which leads to a decrease of the number of components and a cost.

The shielding performance against the electromagnetic noise is achieved not only by a specific member but also by operations of all metallic members arranged around the amplifier substrate. According to the shield structure disclosed in Reference 1, not only the bracket and the ground pattern but also the floor side mounting member and the seat side mounting member both of which are made of metal contribute to the shielding performance. Thus, in a case where a shape or an arrangement of the mounting member is changed, the shielding performance is naturally changed. For example, in a case where a positional height of the strain generating body increases by means of a bracket because of a structure of the seat frame, a rail for moving the seat, and the like, a space below the amplifier substrate increases, which leads to an easy intrusion of the electromagnetic noise. The metallic foil of the grand pattern has an insufficient thickness for the adequate shielding performance. As a result, the electromagnetic noise may influence the load detection performance.

A need thus exists for a load detection device for a vehicle seat which is not susceptible to the drawback mentioned above.

SUMMARY

According to an aspect of this disclosure, a load detection device for a vehicle seat mounted between a floor side mounting mechanism made of metal and a seat side mounting mechanism made of metal and measuring a load applied by an occupant seated on the vehicle seat includes a strain generating body adapted to be fixed via both end portions to a fitting surface formed at one of the floor side mounting mechanism and the seat side mounting mechanism while having a predetermined clearance from the fitting surface, a strain gauge attached to the strain generating body, a bracket made of metal and including an attachment portion that extends laterally relative to the strain generating body, and an amplifier substrate mounted on the attachment portion of the bracket while being arranged in parallel to the strain generating body, both surfaces of the amplifier substrate being covered by one of or more of the bracket, the floor side mounting mechanism and the seat side mounting mechanism, the amplifier substrate amplifying a signal output from the strain gauge.

According to another aspect of this disclosure, a load detection device for a vehicle seat mounted between a floor side mounting mechanism made of metal and a seat side mounting mechanism made of metal and measuring a load applied by an occupant seated on the vehicle seat includes a strain generating body adapted to be fixed via both end portions to a fitting surface formed at one of the floor side mounting mechanism and the seat side mounting mechanism while having a predetermined clearance from the fitting surface, a strain gauge attached to the strain generating body, a bracket made of metal and including an attachment portion that extends laterally relative to the strain generating body, and an amplifier substrate mounted on the attachment portion of the bracket while being arranged in parallel to the strain generating body, one surface of the amplifier substrate being covered by the bracket while the other surface of the amplifier substrate being covered by one of the floor side mounting mechanism and the seat side mounting mechanism, the amplifier substrate amplifying a signal output from the strain gauge.

According to further another aspect of this disclosure, a load detection device for a vehicle seat mounted between a floor side mounting mechanism made of metal and a seat side mounting mechanism made of metal and measuring a load applied by an occupant seated on the vehicle seat includes a strain generating body adapted to be fixed via both end portions to a fitting surface formed at one of the floor side mounting mechanism and the seat side mounting mechanism while having a predetermined clearance from the fitting surface, a strain gauge attached to the strain generating body, a bracket made of metal and including an attachment portion that extends laterally relative to the strain generating body, and an amplifier substrate mounted on the attachment portion of the bracket while being arranged in parallel to the strain generating body, both surfaces of the amplifier substrate being covered by the bracket, the amplifier substrate amplifying a signal output from the strain gauge.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
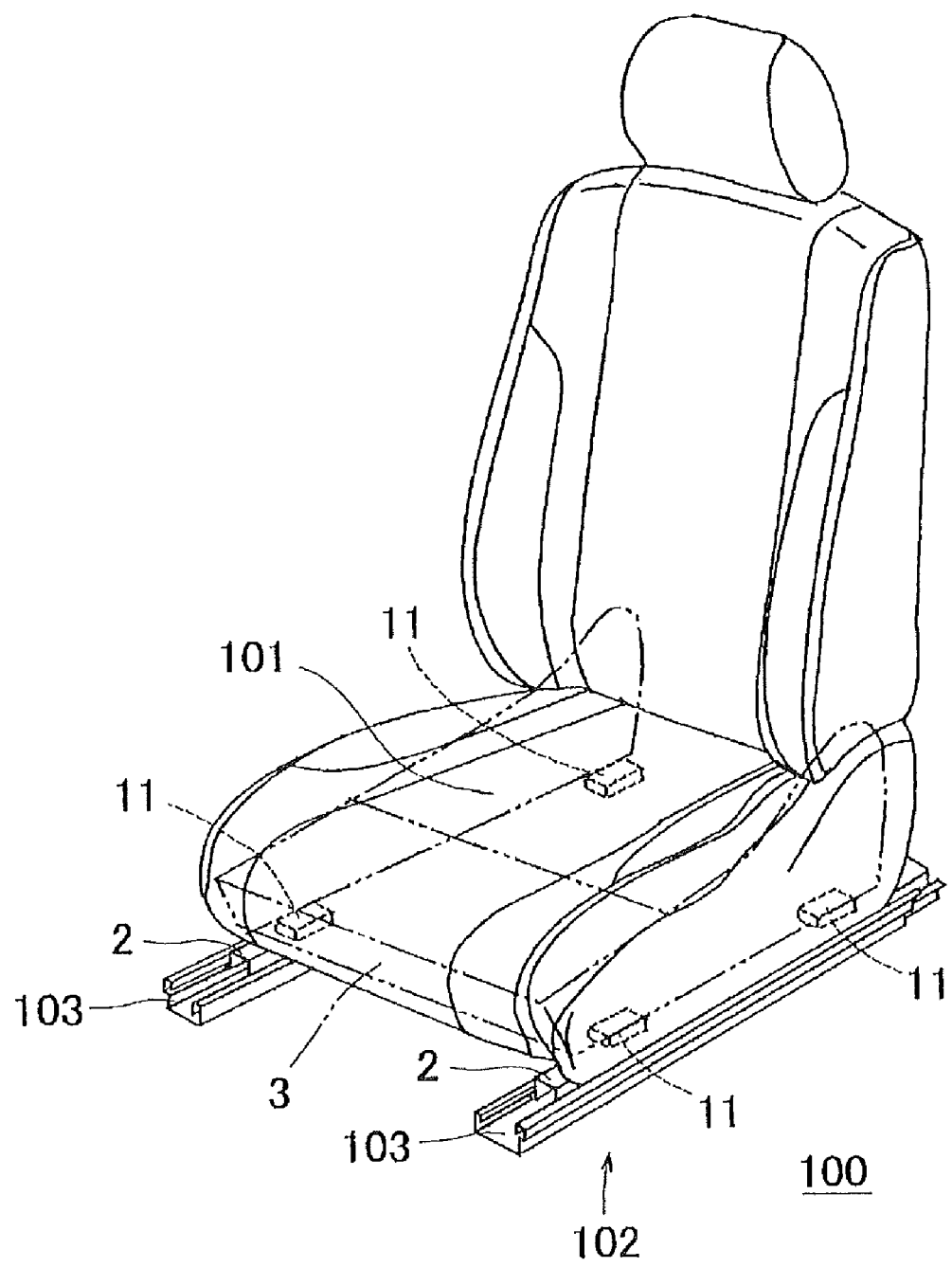
FIG. 1 is a perspective view of a seat apparatus in which a load detection sensor for a vehicle seat according to a first embodiment disclosed here is used.
Figure 2:
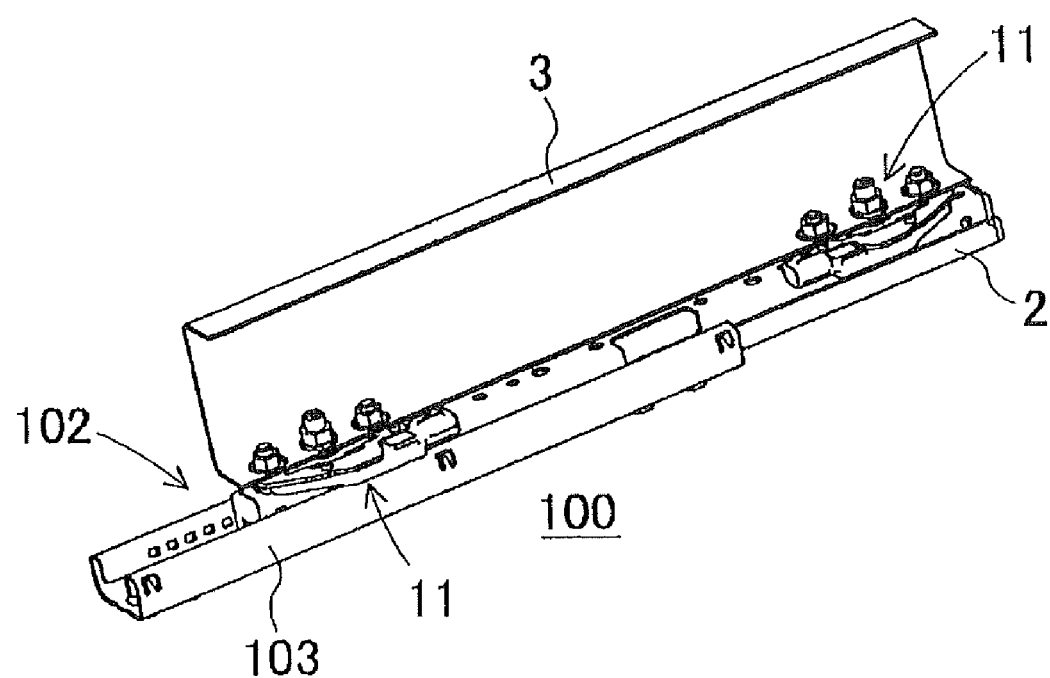
FIG. 2 is a partially enlarged perspective view of a lower portion of the seat apparatus shown in FIG. 1.
Figure 3:
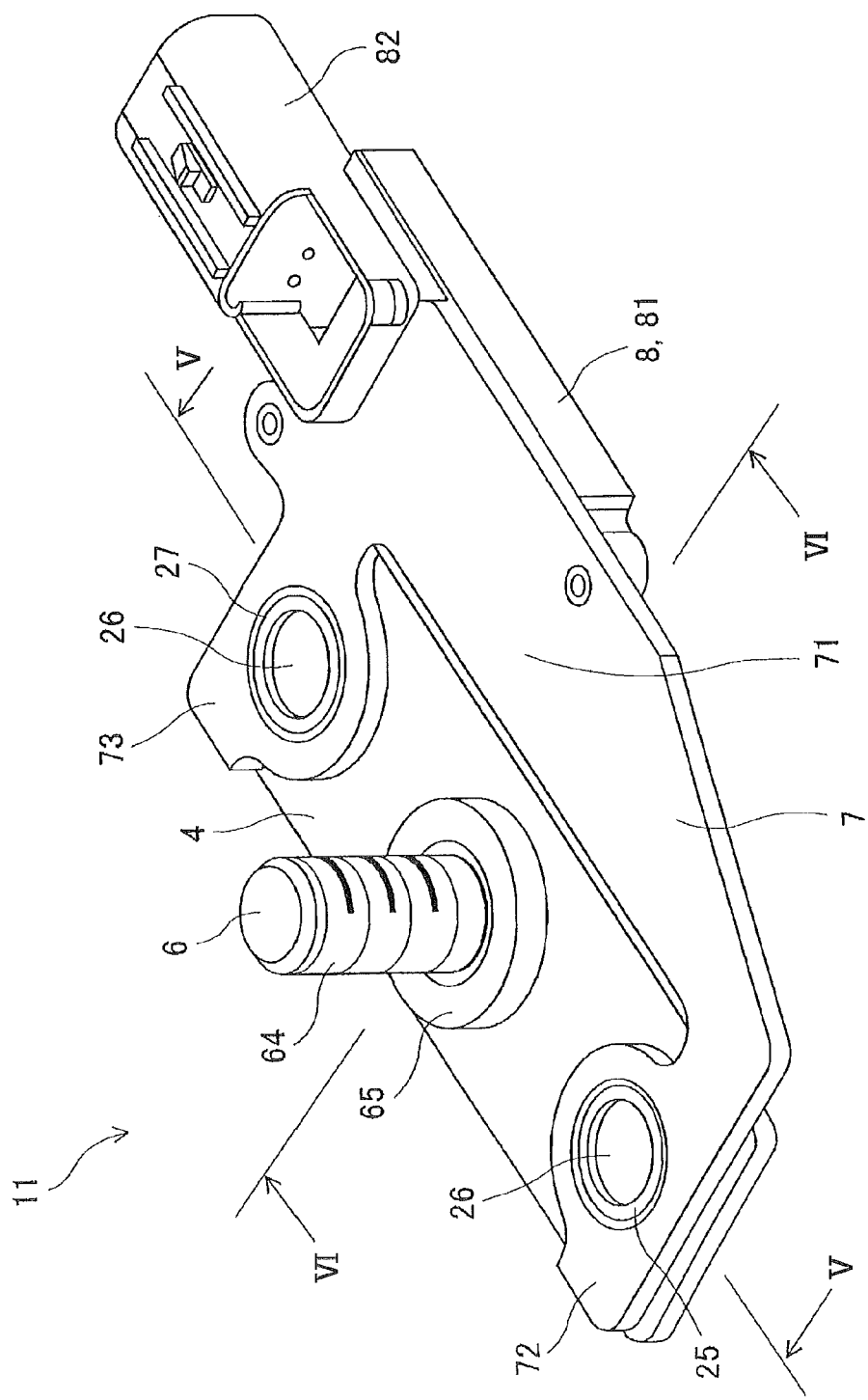
FIG. 3 is a perspective view of the load detection sensor according to the first embodiment.

Embodiments disclosed here will be explained with reference to the attached drawings. In the embodiments, directions and orientations such as left, right, front, rear, top, and bottom correspond to those when viewed from a passenger seated on a seat for a vehicle. A first embodiment will be described below with reference to FIGS. 1 to 6. Load detection sensors for a vehicle seat (hereinafter simply referred to as load detection sensors) 11 each serving as a load detection device for a vehicle seat are provided for measuring a load of an occupant seated on a seat 101. Specifically, as illustrated in FIG. 1, the four load detection sensors 11 are arranged at four corners of a lower portion of a seat frame 3 serving as a seat side mounting mechanism. The seat 101 is slidable by means of a seat slide mechanism 102 in a longitudinal direction of the vehicle. The seat slide mechanism 102 includes a pair of lower rails 103 (i.e., left and right lower rails) that is fixed to a vehicle floor 100 and that extends in the longitudinal direction of the vehicle, a pair of upper rails 2 (i.e., left and right upper rails) serving as a floor side mounting mechanism and supported by the pair of lower rails 103 so as to be movable thereto, and the like. The upper rails 2 and the seat frame 3 are made of a steel plate.

A detailed structure of each of the load detection sensors 11 will be explained with reference to FIGS. 3 to 6. The load detection sensor 11 includes a strain generating body 4, strain gauges 51, 52 attached to a lower surface of the strain generating body 4, a connection shaft 6 fixed to a center portion of the strain generating body 4 and the seat frame 3, an upper bracket 7 serving as a bracket and fixed to an upper surface of the strain generating body 4, and an amplifier substrate 8 mounted on an attachment portion 71 of the upper bracket 7.

Figure 4:
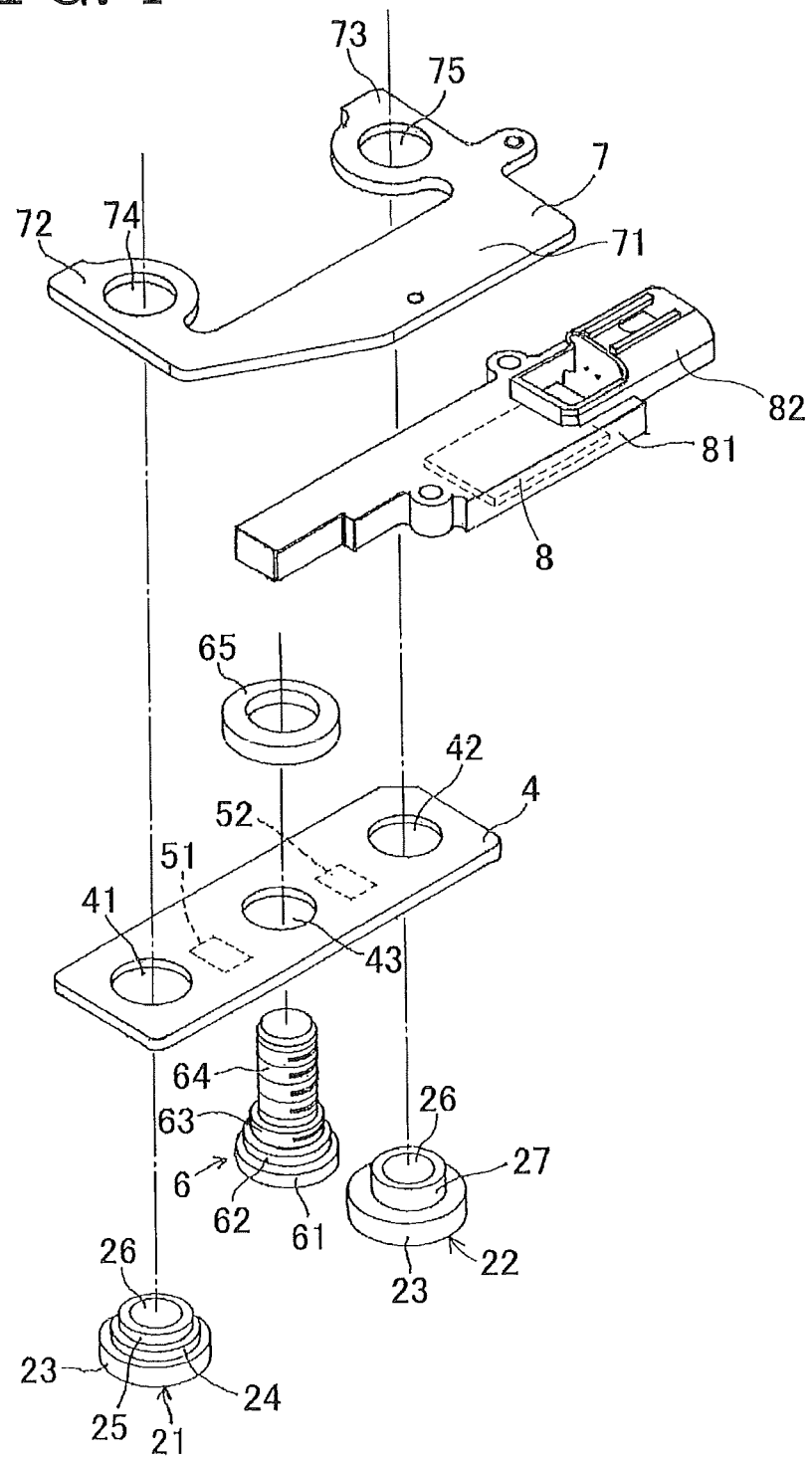
FIG. 4 is an exploded perspective view of the load detection sensor shown in FIG. 3.

As illustrated in FIG. 4, the strain generating body 4 is formed into a substantially rectangular metallic plate shape. First and second holes 41 and 42 are formed at longitudinally both ends of the strain generating body 4 so as to penetrate through a thickness direction of the strain generating body 4. A center hole 43 is formed at a center of the strain generating body 4 so as to penetrate through the thickness direction thereof. A distance between the first and second holes 41 and 42 is equal to a distance between two fixing shafts 28 formed upwardly in a projecting manner at both front and rear ends of the upper rail 2.

Figure 5:
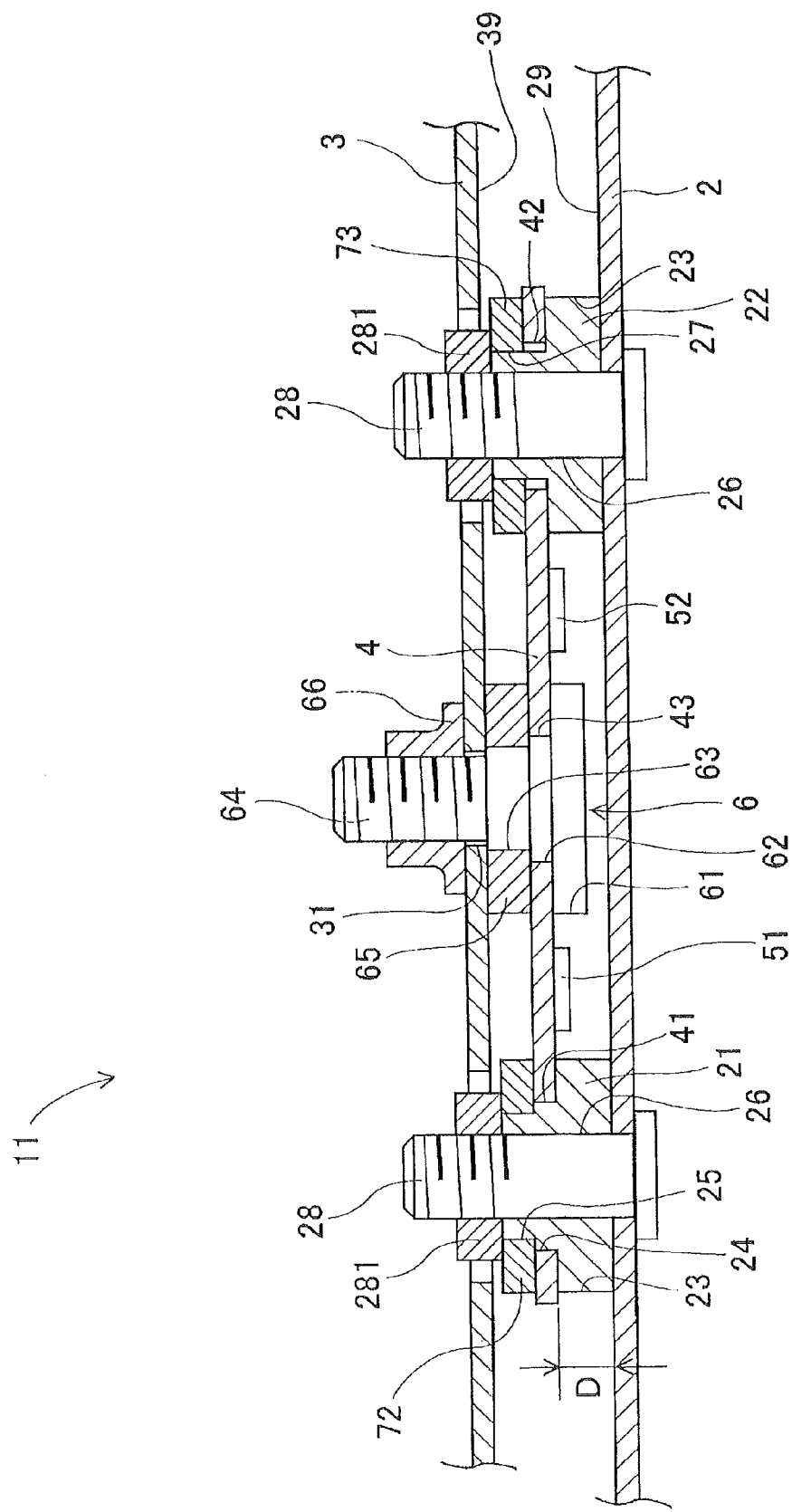
FIG. 5 is a longitudinal sectional view taken along line V-V—in FIG. 3.

The first and second holes 41 and 42 of the strain generating body 4 are fixed to the respective fixing shafts 28 of the upper rail 2 by means of first and second lower brackets 21 and 22. The first lower bracket 21, which is illustrated leftward in FIG. 4, includes a base portion 23, a first intermediate shaft portion 24, a first upper shaft portion 25, and a mounting hole 26. The base portion 23 has a circular shape and a predetermined thickness D (see FIG. 5). The intermediate shaft portion 24 has a diameter smaller than that of the base portion 23 and projects upward from the base portion 23. The first upper shaft portion 25 has a diameter smaller than that of the intermediate shaft portion 24 and projects upward from the intermediate shaft portion 24. The mounting hole 26 penetrates through an axial center. On the other hand, the second lower bracket 22, which is illustrated rightward in FIG. 4, includes the base portion 23 having a circular shape and the predetermined thickness D, a second upper shaft portion 27 having a greatly smaller diameter than that of the base portion 23 and projects upward from the base portion 23, and the mounting hole 26 penetrates through an axial center. As illustrated in FIG. 5, the strain generating body 4 is placed onto both of the lower brackets 21 and 22 from an upper side so as to engage therewith. Specifically, the lower surface of the strain generating body 4 makes contact with upper surfaces of the base portions 23 of the lower brackets 21 and 22. Then, the intermediate shaft portion 24 of the first lower bracket 21 is press-fitted to the first hole 41 of the strain generating body 4 while the second upper shaft portion 27 of the second lower bracket 22 is loosely inserted into the second hole 42 of the strain generating body 4. Diameters of the shaft portions 24 and 27 of the first and second lower brackets 21 and 22 are different from each other so that the intermediate shaft portion 24 is press-fitted to the first hole 41 while the upper shaft portion 27 is loosely inserted to the second hole 42, thereby absorbing a dimensional tolerance that may occur during manufacturing.

As illustrated in FIG. 5, the mounting holes 26 of the first and second lower brackets 21 and 22, together with the strain generating body 4, are placed onto the respective fixing shafts 28 of the upper rail 2 from an upper side so as to engage therewith. Lower surfaces of the base portions 23 of the lower brackets 21 and 22 make contact with an upper surface of the upper rail 2, i.e., a fitting surface 29 thereof. Each nut 281 is screwed from an upper side of a threaded portion formed at a tip end of each of the fixing shafts 28 to thereby collectively press fixing portions 72 and 73 of the upper bracket 7 and the strain generating body 4. Accordingly, the strain generating body 4 is fixed via both end portions to the fitting surface 29 of the upper rail 2 while having a clearance equal to the predetermined thickness D of the base portion 23, from the fitting surface 29.

The center hole 43 of the strain generating body 4 is fixed to the seat frame 3 by means of the connection shaft 6. As illustrated in FIG. 4, the connection shaft 6 includes a flange portion 61, a second intermediate shaft portion 62, a top shaft portion 63, and a fixing screw portion 64. The flange portion 61 is formed into a circular shape, having a thickness smaller than that of the base portion 23 of the first or second lower bracket 21, 22. The second intermediate shaft portion 62 has a smaller diameter than that of the flange portion 61 and projects upward from the flange portion 61. The top shaft portion 63 has a smaller diameter than that of the second intermediate shaft portion 62 and projects upward from the second intermediate shaft portion 62. The fixing screw portion 64, on which a male screw is formed, has a smaller diameter than that of the top shaft portion 63 and projects upward from the top shaft portion 63. As illustrated in FIG. 5, the second intermediate shaft portion 62 of the connection shaft 6 is press-fitted to the center hole 43 of the strain generating body 4 from a lower side while an upper surface of the flange portion 61 makes contact with the lower surface of the strain generating body 4. Then, an annular-shaped center bracket 65 is press-fitted to the top shaft portion 63 from an upper side, thereby sandwiching the strain generating body 4 by the flange portion 61 and the center bracket 65. That is, the connection shaft 6 is fixed to the strain generating body 4.

Further, the fixing screw portion 64 of the connection shaft 6 is connected and fixed to the seat frame 3. Specifically, a connection hole 31 is formed at the seat frame 3 so as to penetrate through a thickness direction thereof. A bottom surface of the seat frame 3 forms a connection surface 39. The fixing screw portion 64 of the connection shaft 6 is inserted and fitted to the connection hole 31 from a lower side and then the connection surface 39 of the seat frame 3 makes contact with an upper surface of the center bracket 65. A nut 66 is screwed onto the fixing screw portion 64 from an upper side to thereby press the connection surface 39 against the center bracket 65. As a result, the connection shaft 6 is fixed to the seat frame 3.

The aforementioned explanation will be summarized as follows. The both longitudinal end portions of the strain generating body 4 are fixed to the upper rail 2 while the center portion of the strain generating body 4 is fixed to the seat frame 3 via the connection shaft 6. Thus, when the occupant is seated on the seat 101, the load of the occupant acts on the strain generating body 4 via the connection shaft 6. The center portion of the strain generating body 4 deflects downwardly. At this time, strain is generated at portions of a lower surface of the strain generating body 4 between the first lower bracket 21 and the connection shaft 6 and between the second lower bracket 22 and the connection shaft 6. Specifically, a compression strain is generated at portions close to the first and second lower brackets 21 and 22. A tensile strain is generated at portions close to the connection shaft 6. In order to detect the compression strain and the tensile strain, the strain gauges 51 and 52 are attached to portions of the lower surface of the strain generating body 4 between the both end portions and the center portion thereof, i.e., the portions of the lower surface between the first lower bracket 21 and the connection shaft 6 and between the second lower bracket 22 and the connection shaft 6. Each of the strain gauges 51 and 52 includes two elements constituting a half bridge. Both half bridges of the strain gauges 51 and 52 are connected to form a full bridge within the amplifier substrate 8 so that a load measurement with a high sensitivity is obtained.

Figure 6:
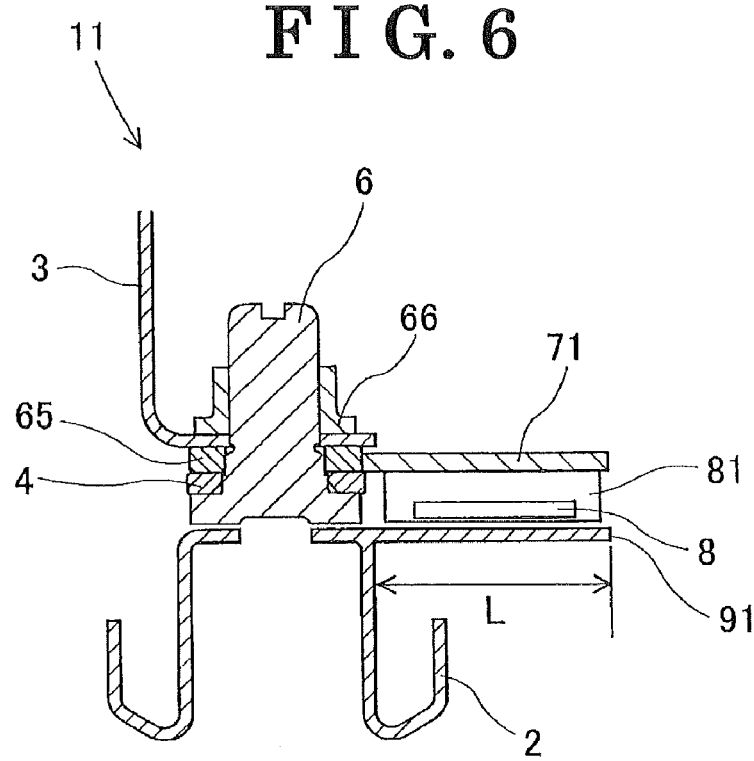
FIG. 6 is a cross-sectional view taken along line VI-VI in FIG. 3.

As illustrated in FIG. 4, the upper bracket 7 made of a steel plate is mounted on the upper surface of the strain generating body 4, specifically, in the vicinity of the first and second holes 41 and 42. The upper bracket 7, which is formed into a plate shape, includes the attachment portion 71 and the fixing portions 72 and 73. The attachment portion 71 is formed into a substantially pentagonal shape obtained by cutting one corner of a rectangle into a tapered shape. Fixing holes 74 and 75 are formed at the fixing portions 72 and 73, respectively, so as to penetrate through the thickness direction. The upper shaft portions 25 and 27 of the first and second lower brackets 21 and 22 that project from the holes 41 and 42 are press-fitted to the fixing holes 74 and 75, respectively. Thus, the fixing portions 72 and 73 of the upper bracket 7 are positioned above the holes 41 and 42. In addition, the attachment portion 71 extends laterally relative to the strain generating body 4 as illustrated in FIG. 6. Accordingly, because the upper bracket 7 is prevented from overlapping the strain generating body 4 except for the fixing portions 72 and 73, the upper bracket 7 is restrained from influencing the deformation of the strain generating body 4, thereby achieving the accurate measurement of the load of the occupant seated on the seat 101.

An amplifier case 81 made of PBT resin (Polybutylene terephthalate), for example, is mounted on a lower side of the attachment portion 71 of the upper bracket 7 while being arranged next to the strain generating body 4 in parallel thereto (see FIG. 6). The amplifier case 81 made of PBT resin achieves reduction in weight and cost compared to a conventional aluminum amplifier case. The amplifier substrate 8 and an FPC substrate connecting the amplifier substrate 8 to the strain gauges 51 and 52 are accommodated within the amplifier case 81. In addition, a connector 82 is provided at the amplifier case 81 so as to connect a communication line for transmitting an output of the amplifier substrate 8 to an electronic control unit.

As illustrated in FIG. 6, a shield portion 91 is arranged at a lower side of the amplifier case 81. The shield portion 91 is made of a steel plate same as the upper rail 2 and is integrally formed at the upper rail 2. The shield portion 91 extends rightward from an upper right edge of the upper rail 2 in FIG. 6. The shield portion 91 extends by a length L, which is substantially the same as a length of the attachment portion 71, by passing through the lower side of the amplifier case 81. The shield portion 91 and the attachment portion 71 are arranged in substantially parallel to each other.

Operations of the load detection sensors 11 having the aforementioned structure will be explained below. When the occupant is seated on the seat 101, the four load detection sensors 11 are deflected in response to the load of the occupant. The electrical resistance of each of the strain gauges 51 and 52 is changed, thereby outputting a weak voltage signal. The voltage signal is amplified by the full bridge of the amplifier substrate 8, converted to a digital signal by an A/D converter circuit, and then transmitted to the electronic control unit via the connector 82. The electronic control unit obtains the load of the occupant by a sum of the digital signals from the four load detection sensors 11.

An upper surface of the amplifier substrate 8 is covered by the attachment portion 71 of the upper bracket 7 while a lower surface of the amplifier substrate 8 is covered by the shield portion 91. That is, a shield structure in which both surfaces (the upper and lower surfaces) of the amplifier substrate 8 are covered by metallic plate members is achieved. Thus, compared to a conventional load detection sensor in which one surface of the amplifier substrate is covered by the ground pattern of thin metal foil, the shielding performance according to the present embodiment increases, which leads to the stable shielding effect against a strong electromagnetic noise. The decrease in detection accuracy is prevented from occurring. The strain gauges 51 and 52 are attached to the lower surface of the metallic strain generating body 4 and further the metallic upper rail 2 is arranged at the lower side of the strain generating body 4. Thus, the sufficient shielding performance is obtained.

In order to achieve the aforementioned shield structure, a configuration of one of the upper bracket 7, the upper rail 2 (floor side mounting mechanism), and the seat frame 3 (seat side mounting mechanism) is simply changed. Conventional members are applicable to the seat frame 3, the strain generating body 4, the strain gauges 51, 52, the connection shaft 6, the upper bracket 7, the amplifier substrate 8, and the like in the present embodiment, and the shield portion 91 is integrally formed at the upper rail 2. Thus, the number of components constituting the load detection sensor 11 is prevented from increasing and the reduction in size, weight, and cost is still maintained.

Next, second to fourth embodiments will be explained with reference to FIGS. 7 to 9. Differences of the second to fourth embodiments from the first embodiment will be mainly described below. According to the second to fourth embodiments, the strain generating body 4, the strain gauges 51, 52, the connection shaft 6, the upper bracket 7, and the amplifier substrate 8 are same as those in the first embodiment.

Figure 7:
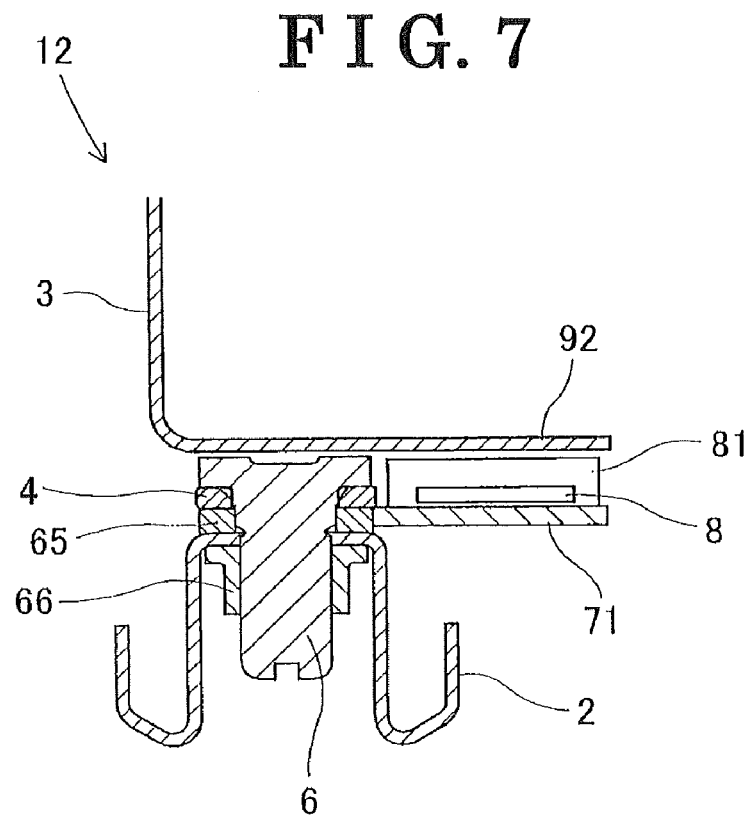
FIG. 7 is across-sectional view of a load detection device for a vehicle seat according to a second embodiment disclosed here.

In the second embodiment, as illustrated in FIG. 7, the strain generating body 4 in each load detection sensor 12 is mounted in a vertically reversed manner compared to the strain generating body 4 according to the first embodiment. Specifically, the holes 41, 42 formed at both ends of the strain generating body 4 are fixed to fixing shafts formed in a downwardly projecting manner at a lower surface of the seat frame 3. The center hole 43 formed at a center of the strain generating body 4 in the longitudinal direction thereof is fixed to the upper rail 2 via the connection shaft 6. In association with such structure, the first and second lower brackets 21, 22 and the upper bracket 7 are arranged in a vertically reversed manner compared to those according to the first embodiment. As illustrated in FIG. 7, the amplifier substrate 8 and the amplifier case 81 are mounted on an upper side of the attachment portion 71 of the upper bracket 7. A shield portion 92 is formed to extend rightward from a bottom surface of the seat frame 3 by passing through the upper side of the amplifier case 81.

According to the load detection sensor 12 of the second embodiment, the both surfaces of the amplifier substrate 8 are covered by metallic plate members in the same way as the first embodiment, which enhances the shielding performance. In addition, because conventional members are mostly applicable to components of the load detection sensor 12, reduction in size, weight, and cost can be maintained.

Figure 8:
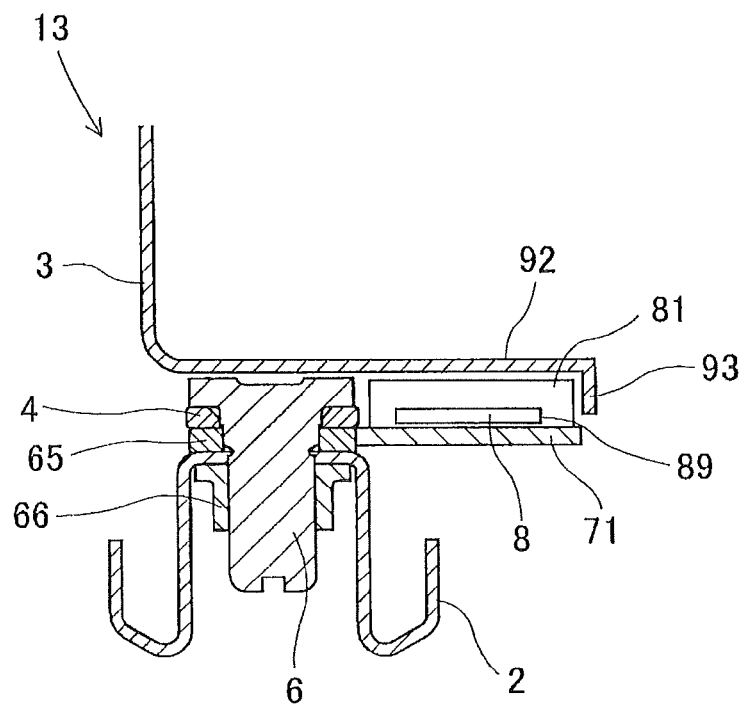
FIG. 8 is a cross-sectional view of a load detection device for a vehicle seat according to a third embodiment disclosed here.

In the third embodiment, as illustrated in FIG. 8, a right end of the shield portion 92 in each load detection sensor 13 is bent downward to form an end shield portion 93. The end shield portion 93 covers an end face 89 of the amplifier substrate 8.

According to the load detection sensor 13 of the third embodiment, in addition to the both surfaces of the amplifier substrate 8, the end face 89 is covered by the metallic plate member, which further improves the shielding performance.

Figure 9:
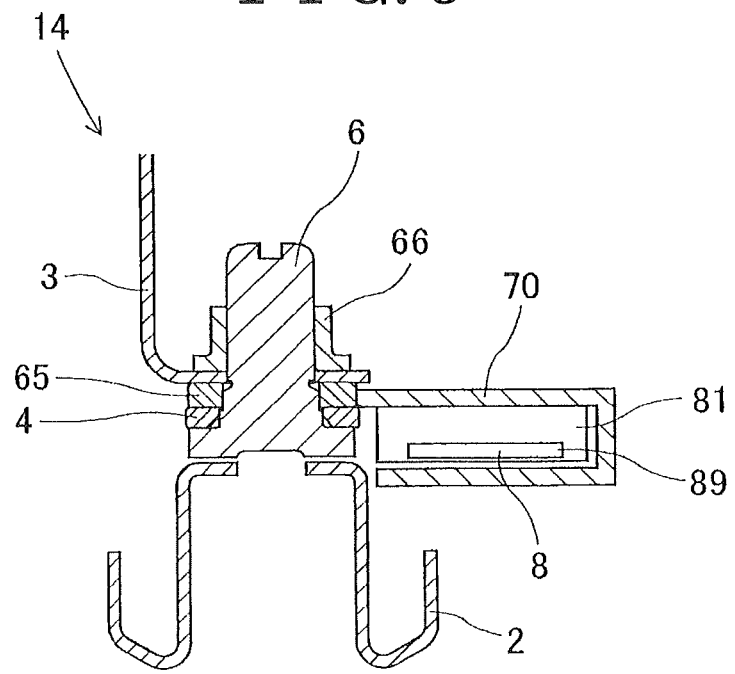
FIG. 9 is a cross-sectional view of a load detection device for a vehicle seat according to a fourth embodiment disclosed here.

In the fourth embodiment, as illustrated in FIG. 9, instead of the shield portion 91 of the first embodiment, an upper bracket 70 having a substantially U-shape in cross section is provided at a load detection sensor 14. The upper bracket 70 extends rightward from the strain generating body 4 and passes through an upper side of the amplifier substrate 8. Afterwards, the upper bracket 70 is bent downward and then leftward to pass through the lower side of the amplifier substrate 8 to return to the strain generating body 4.

According to the load detection sensor 14 of the fourth embodiment, the both surfaces of the amplifier substrate 8 and the end face 89 are covered by the upper bracket 70. Thus, the shielding performance is further enhanced and stabilized in the same way as the third embodiment.

In the second to fourth embodiments, each of the shield portion 92, the end shield portion 93, and the upper bracket 70 formed into the substantially U-shape in the cross section is formed by a simple process such as a bending process. As a result, a cost increase is prevented.

Figure 10:
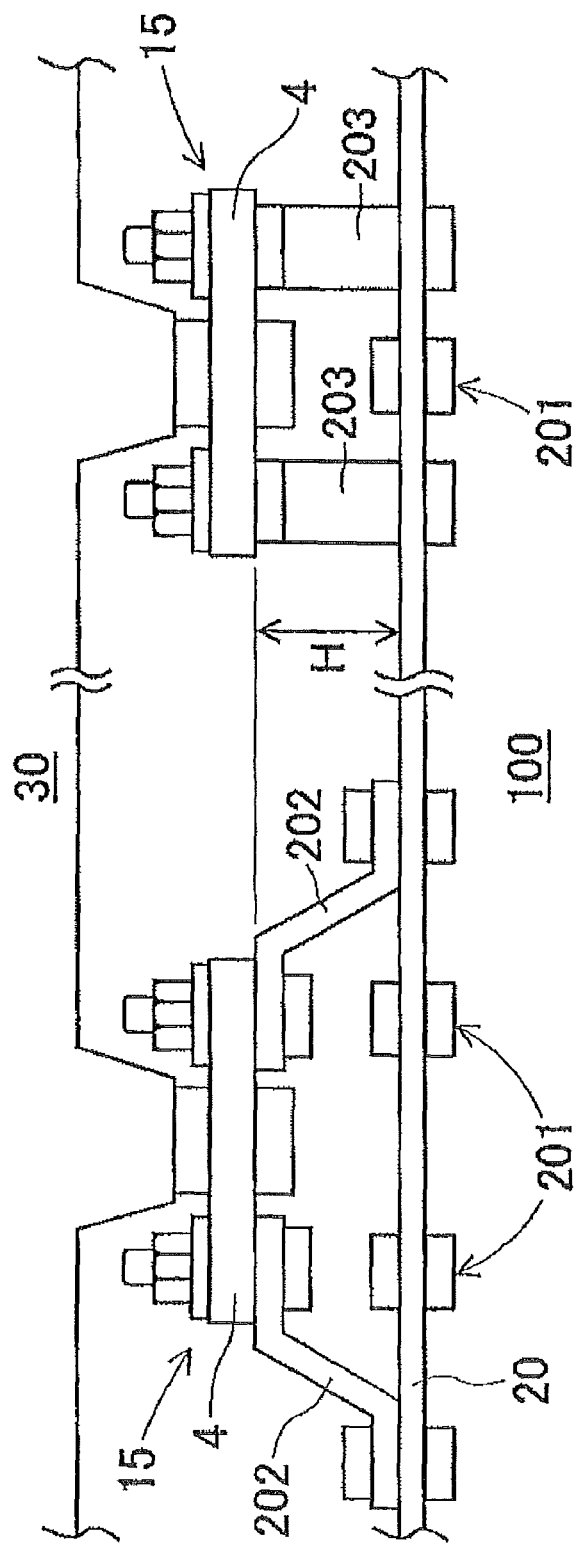
FIG. 10 is a side view schematically illustrating a load detection device for a vehicle seat according to a fifth embodiment mounted on a height increasing member.

The fifth embodiment having a different floor side mounting mechanism will be explained with reference to FIG. 10. According to the fifth embodiment, in order to avoid interference between load detection sensors 15 and contact avoiding members 201 such as riveting pins, a height increasing bracket 202 and a height increasing bush 203 each serving as a height increasing member and the floor side mounting mechanism are provided at an upper rail 20. Then, the load detection sensors 15 are disposed between the height increasing bracket 202 and a seat frame 30, and between the height increasing bush 203 and the seat frame 30. In FIG. 10, the both ends of the strain generating body 4 constituting each of the load detection sensors 15 are fixed to the height increasing member 202 or 203 while the center of the strain generating body 4 is fixed to the seat frame 30. Each of the load detection sensors 15 may be achieved by replacement of the upper rail 2 applied in each of the first to fourth embodiments as illustrated in FIGS. 6 to 9 by the height increasing members 202 and 203.

According to the load detection sensor 15 of the fifth embodiment, the strain generating body 4 and the seat frame 30 are provided at a high position by a height H at each of the height increasing members 202 and 203. Therefore, a clearance between the strain generating body 4 and the vehicle floor 100 is enlarged, thereby increasing the strength of the electromagnetic noise that reaches the load detection sensor 15. However, in response to such issue, the load detection sensor 15 has the high shield structure in which the both surfaces of the amplifier substrate are covered by the metallic plate members, thereby effectively restraining intrusion of the electromagnetic noise even at a time the strength of the electromagnetic noise increases.

According to the first to firth embodiments, the upper rail 2 or 20, the seat frame 3, and the upper bracket 7 or 70 are each made of a metallic plate. Alternatively, such members may be made of an aluminum alloy.

The load detection sensor 11, 12, 13 also includes the shield portion 91, 92 integrally formed at one of the upper rail 2 (floor side mounting mechanism) and the seat frame 3 (seat side mounting mechanism) and extending laterally relative to the strain generating body 4 to cover the other surface of the amplifier substrate 8.

The load detection sensor 13 also includes the end shield portion 93 formed to bend at one of the bracket 7 and an end of the shield portion 92 which extends laterally relative to the strain generating body 4 to cover the end face 89 of the amplifier substrate 8.

The floor side mounting mechanism is the upper rail 2 slidably supported by the lower rail 103 adopted to be fixed to the vehicle floor 100 and the shield portion 91 is formed at the upper rail 2.

The floor side mounting mechanism is the height increasing member 202, 203 adapted to be fixed to the upper rail 20 slidably supported by the lower rail 103 that is adapted to be fixed to the vehicle floor 100 and the shield portion is formed at the height increasing member 202, 203.

The bracket 70 extends laterally from the strain generating body 4 and bends to be formed into a U-shape in a cross section, the bracket 70 covering the both surfaces and the end face 89 of the amplifier substrate 8.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A load detection device for a vehicle seat mounted between a floor side mounting mechanism made of metal and a seat side mounting mechanism made of metal and measuring a load applied by an occupant seated on the vehicle seat, comprising:
    a strain generating body adapted to be fixed via both end portions to a fitting surface formed at one of the floor side mounting mechanism and the seat side mounting mechanism while having a predetermined clearance from the fitting surface;
    a strain gauge attached to the strain generating body;
    a bracket made of metal and including an attachment portion that extends laterally relative to the strain generating body; and
    an amplifier substrate mounted on the attachment portion of the bracket while being arranged in parallel to the strain generating body, one surface of the amplifier substrate being covered by the bracket while the other surface of the amplifier substrate being covered by one of the floor side mounting mechanism and the seat side mounting mechanism, the amplifier substrate amplifying a signal output from the strain gauge.

2. The load detection device according to claim 1, further comprising a shield portion integrally formed at one of the floor side mounting mechanism and the seat side mounting mechanism and extending laterally relative to the strain generating body to cover the other surface of the amplifier substrate.

3. The load detection device according to claim 2, further comprising an end shield portion formed to bend at one of the bracket and an end of the shield portion which extends laterally relative to the strain generating body to cover an end face of the amplifier substrate.

4. The load detection device according to claim 2, wherein the floor side mounting mechanism is an upper rail slidably supported by a lower rail adopted to be fixed to a floor for a vehicle and the shield portion is formed at the upper rail.

5. The load detection device according to claim 2, wherein the floor side mounting mechanism is a height increasing member adapted to be fixed to an upper rail slidably supported by a lower rail that is adapted to be fixed to a floor for a vehicle and the shield portion is formed at the height increasing member.

6. The load detection device according to claim 1, wherein the seat side mounting mechanism is a seat frame, and wherein the load detection device is arranged at a lower portion of the seat frame.

7. A load detection device, in combination with a vehicle seat and a floor side mounting mechanism, to measure a load of an occupant seated on the vehicle seat;
    the vehicle seat comprising a seat frame constituting a seat side mounting mechanism made of metal;
    the floor side mounting mechanism being configured to mount the vehicle seat on a floor of a vehicle and being made of metal;
    the load detection device comprising:
        a strain generating body having end portions fixed to a fitting surface formed at one of the floor side mounting mechanism and the seat side mounting mechanism, with a clearance between the strain generating body and the fitting surface;
        a strain gauge attached to the strain generating body and outputting a signal;
        a metal bracket possessing an attachment portion extending laterally beyond the strain generating body; and
        an amplifier substrate connected to the strain gauge to amplify the signal output from the strain gauge, the amplifier substrate being mounted on the attachment portion of the bracket and arranged parallel to the strain generating body, the amplifier substrate possessing one surface and an oppositely facing other surface, the one surface of the amplifier substrate being covered by the metal bracket while the other surface of the amplifier substrate is covered by one of the metal floor side mounting mechanism and the metal seat side mounting mechanism.

8. The load detection device according to claim 7, further comprising a shield portion integrally formed at one of the metal floor side mounting mechanism and the metal seat side mounting mechanism, the shield portion extending laterally relative to the strain generating body to cover the other surface of the amplifier substrate.

9. The load detection device according to claim 7, wherein the floor side mounting mechanism is a metal upper rail slidably supportable on a lower rail to slidably move along the lower rail, and the other surface of the amplifier substrate is covered by a laterally extending integral portion of the upper rail extending from an upper edge of the upper rail, the laterally extending integral portion of the upper rail extending substantially parallel to the attachment portion of the bracket and over a length that is substantially the same as the length of the attachment portion of the bracket.

10. The load detection device according to claim 7, wherein the floor side mounting mechanism is a metal height increasing member adapted to be fixed to an upper rail slidably supported by a lower rail that is adapted to be fixed to a floor for a vehicle and the shield portion is formed at the height increasing member.

11. The load detection device according to claim 7, wherein the one surface of the amplifier substrate is an upwardly facing surface of the amplifier substrate and is covered by the metal, and the other surface of the amplifier substrate is a downwardly facing surface of the amplifier substrate below which is positioned the metal bracket.

* * * * *